United States Patent [19]

Schaefer et al.

[11] 4,410,248
[45] Oct. 18, 1983

[54] OPTICAL AND FOCUSING ARRANGEMENT FOR MICROFICHE READER

[75] Inventors: George H. Schaefer, Wauwatosa; Stephen P. Hirsch, North Prairie, both of Wis.

[73] Assignee: Realist, Inc., Menomonee Falls, Wis.

[21] Appl. No.: 369,097

[22] Filed: Apr. 16, 1982

[51] Int. Cl.³ .............................................. G03B 23/08
[52] U.S. Cl. ................................... 353/27 R; 353/76; 353/101; 350/247
[58] Field of Search ................. 353/101, 27 R, 26 R, 353/76, 99, 100; 350/241, 247, 429, 430; 354/195, 197; 355/58; 352/139, 140, 142

[56] References Cited

U.S. PATENT DOCUMENTS

| | | | |
|---|---|---|---|
| 2,194,384 | 3/1940 | Dewey | 355/58 |
| 2,558,982 | 7/1951 | Pratt et al. | 353/26 R X |
| 3,597,064 | 8/1971 | Caraway | 353/101 |
| 3,792,923 | 2/1974 | Pfeifer et al. | 353/27 R |
| 3,893,135 | 7/1975 | Matsui et al. | 355/58 X |
| 4,067,648 | 1/1978 | Spreitzer | 353/101 X |
| 4,119,983 | 10/1978 | Tanaka | 354/197 |
| 4,314,745 | 2/1982 | Freiberg | 353/101 |

Primary Examiner—Stephen Marcus
Assistant Examiner—William Sharp
Attorney, Agent, or Firm—Bayard H. Michael

[57] ABSTRACT

The microfiche reader has two lenses carried by a segment mounted on an eccentric pivot which can be adjusted to move the pivot and, therefore, the lenses are in an eliptical orbit which permits the lens in the operative position to be centered on the optical path. When the segment is shifted to move the other lens into position that lens will be centered. Each lens is focused by moving the associated focusing slide in and out to move the parallel cams under the bosses carried by the lens barrel flange to raise and lower the lens to focus the image. The image is centered on the screen by adjusting the first mirror which is mounted on a bracket which pivots on a housing partition and has a wedge between the bracket and the partition. The bracket has teeth which engage serrations on the wedge so when the retaining screw is tightened the wedge is locked in place.

8 Claims, 7 Drawing Figures

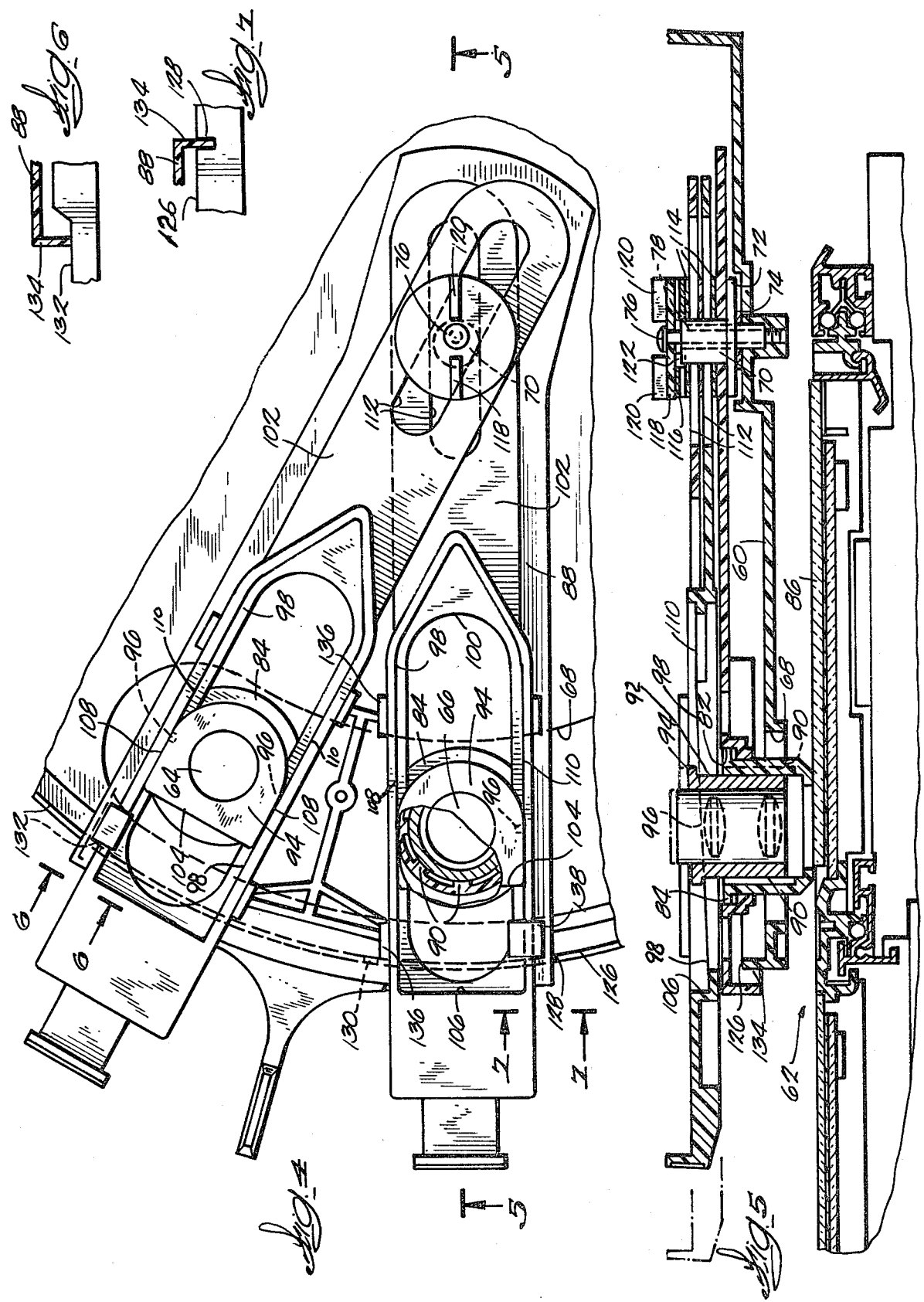

OPTICAL AND FOCUSING ARRANGEMENT FOR MICROFICHE READER

BACKGROUND OF THE INVENTION

This invention relates to the projection system of a microfiche reader. Typically such systems have the bulb projecting light horizontally through a condensing lens and mirror arrangement to project the light upwardly through a fiche in a carrier. The objective lens is positioned above the carrier and is focused to obtain a sharp image on the screen. The image is reflected by one or two mirrors onto a front projection screen or a rear projection screen. This invention positions the first mirror just above the objective lens. In the part this arrangement made lens removal difficult and frequently required removal of the first mirror to get at the lens. Focusing the lens involves rotating the lens in a sleeve and that arrangement requires a number of parts and is somewhat costly. The lens should be centered with respect to the optical axis but in prior designs this has been ignored or achieved by cumbersome means. The first mirror should be precisely located to properly center the image without allowing an appreciable "margin" to accomodate misalignment. Those prior designs which did have means for rapidly shifting from one to another lens depending on the magnification desired employed a design which was costly and difficult to service.

SUMMARY OF THE INVENTION

The object of this invention is to simplify and reduce the cost of the projection system in a microfiche reader while making the reader easier to use and service and optimizing the system. Another object is to provide an easily adjusted first mirror which is fixed in place after adjustment. Another object is to provide an improved lens focusing arrangement which is fully compatable with a lens selection shifting segment. A further object is to provide a lens selection/shifting segment which is readily adjusted to center the lens in use with respect to the projection axis.

BRIEF DESCRIPTION OF THE DRAWINGS

FIG. 3 is an exploded perspective view of the lens carrying segment and focus mechanism.

FIG. 4 is a plan view of the segment and focus arrangement.

FIG. 5 is a section on line 5—5 in FIG. 4.

FIG. 6 is an enlarged detail of one support for the front of the segment.

FIG. 7 is an enlarged detail of another support for the front of the segment.

DETAILED DESCRIPTION OF THE DRAWINGS

Figure 1:
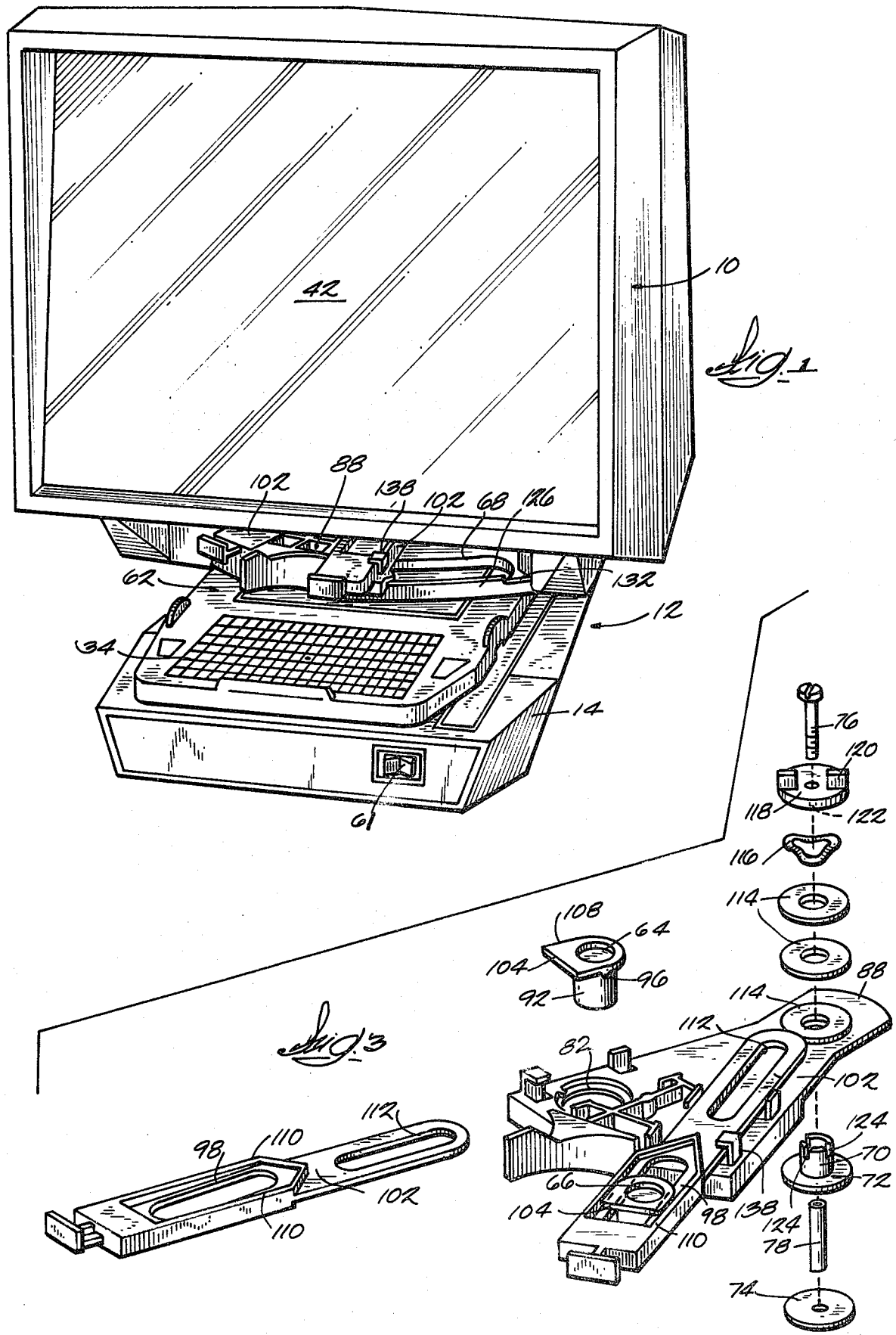
FIG. 1 is a perspective view of the reader.
Figure 2:
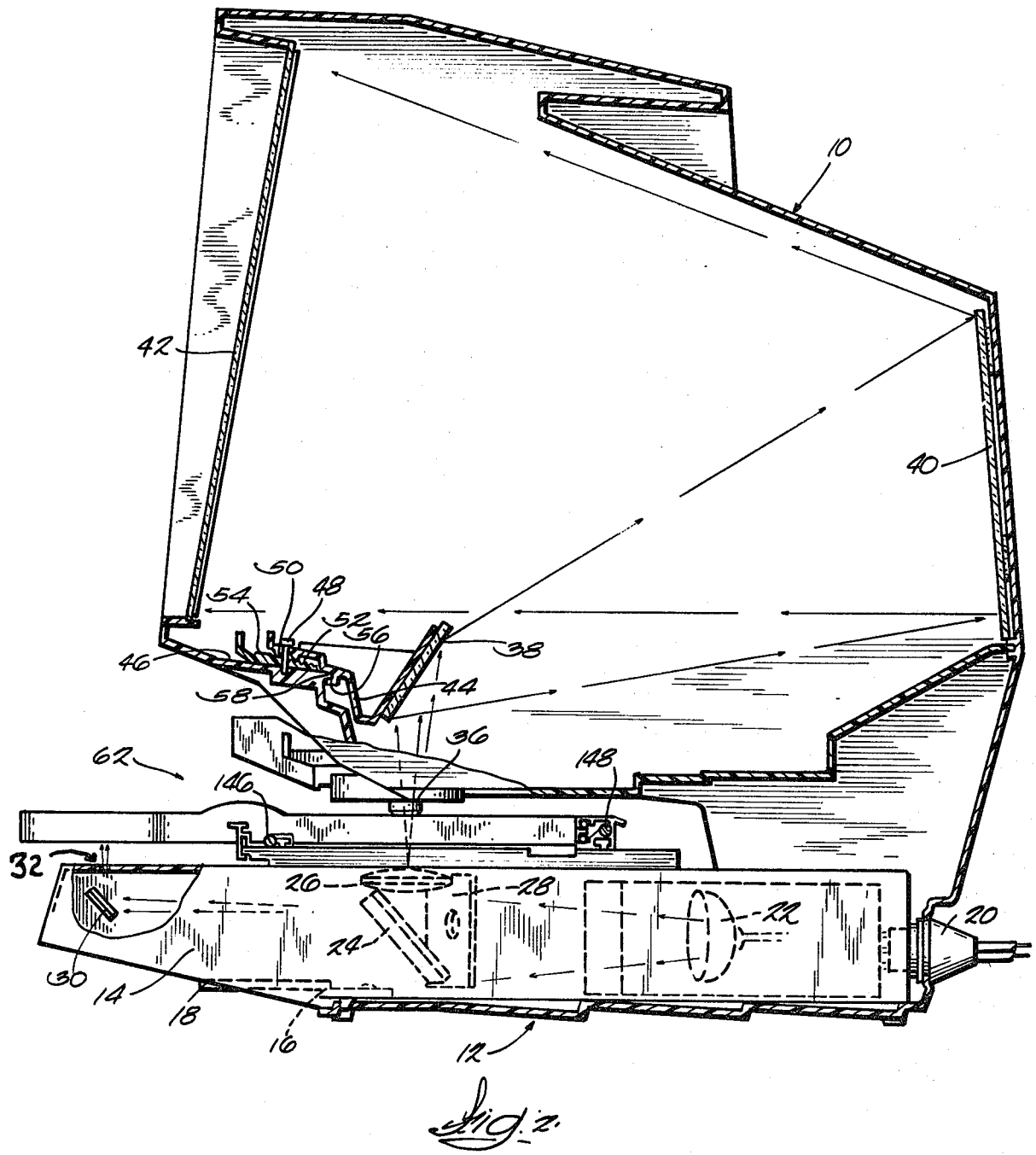
FIG. 2 is a vertical section through the reader.

The reader has a housing 10 which includes a lower portion 12 in which a drawer or base 14 is mounted for easy removal by pulling the drawer forwardly after first releasing latch 16 by pressing the exposed end 18 upwardly to lift the latch out of the cooperating aperture in the lower portion of the housing. The rear of the drawer is provided with an electrical connection which automatically disconnects the drawer from the power supply 20 as the drawer is removed. The power supply feeds a transformer which steps down the voltage supply for bulb 22 which projects light forwardly to mirror 24 which reflects the light upwardly through condenser lens 26. All portions of the drawer exposed to heat are made of metal. The metal structure includes the baffle 28 which is apertured to let light pass to mirror 24, and a certain amount of light will spill on to the small mirror 30 positioned at the front of the base to reflect light up through the aperture 32 in the upper surface of the base to give a small spot of light which serves as the index illuminating the proper coordinates on the index grid 34 to enable rapid location of the desired image on the microfiche. Light passing through the microfiche image passes through lens 36 and strikes the front surface mirror 38 which reflects the image to the mirror 40 at the back of the housing 10 and the image then is reflected forwardly to the rear projection screen 42.

The first mirror 38 is supported on a plastic support bracket 44 which is fixed to the divider panel 46 by means of screw 48. The underside of the bracket 44 is provided with a serrated tooth 50 which engages serrations 52 on the upper surface of the adjusting wedge 54 while the hook 56 depending from the bracket engages lip 58 as a pivot point. This enables the angle of the mirror to be precisely adjusted before screw 48 is tightened to precisely locate the image on the screen. Once adjusted at the factory this should require no further attention since the tooth 50 locks into a tooth 52 on the wedge 54 to hold it in place.

The front of the drawer is provided with the power switch 61 to operate the light at high, low or off. The drawer contains all the electrical and lower optical system. The microfiche and index carrier 62 is carried on the base for free movement from front to back and side to side to enable the desired fiche image to be located. The carrier is removed with the drawer so servicing of either is simple. The reader is provided with means for rapidly selecting either of two lenses for different magnification and means are provided for focusing the lens in use independent of the other.

The upper portion of the reader has a horizontal partition 60 on which a lens carrying segment 88 is pivotly mounted to permit selection of either of two lenses 64, 66 for active use. The partition 60 has an arcuate opening 68 permitting the lenses to depend through the opening. The pivot for segment 88 comprises an eccentric 70 including an annular bearing 72. The rear end of the segment is provided with a circular opening fitting over the eccentric 70. The bearing 72 of the eccentric rests on top of a washer 74. Screw 76 passes through a sleeve 78 and threads into the partition 60. The eccentric 70 has a cylindrical surface and can be rotated about the off-center axis of screw 76.

The segment 88 supports two guide sleeves. Each guide sleeve is mounted in a depressed aperture 82 having an inwardly projecting shoulder which serves as a limit stop to downward movement of the sleeve when engaged by the upper flange 84 on the guide sleeve. Normally, the sleeve can rest on the upper glass pressure plate 86 of the microfiche carrier 62. Each sleeve has internal guide ribs 90 which guide the lens barrel 92 for vertical movement.

The upper end of the lens barrel has a flange 94 having diametrically opposed bosses or ribs 96 on the underside of the flange and which rest on the cam tracks 98 molded on each side of the aperture 100 of the focusing slide 102. As may be seen in FIGS. 5 and 3 the cam tracks or surfaces 98 rise from front to rear (left to right)

of the focusing slide 102. Since the lens barrel bosses 96 rest on the cam surfaces 98 the lens barrel will rise and fall as the slide is pulled out or pushed in relative to segment 88. This focuses the lens and hence the image on the screen. The lens barrel flange 94 is curved on the right side (FIGS. 4 and 5) but projects to the left of the center line and has a flat left end 104 which at the limit of movement of the slide 102 is engaged by the surface 106 at the left end of the slide opening 102. This then gives two flat surfaces 108, 108 engaging the sides of the upstanding rim 110 of the slide and restricting the lens barrel from rotation. As the slide moves left and right in FIGS. 4 and 5, the lens will be raised or lowered to focus the image.

The inner end of each slide is provided with a slot 112 which fits over and is guided by the eccentric. Since the two slots 112 fit over the eccentric 70 the point of intersection of the slots must be at eccentric 70 and move with the eccentric. The inner end of the lower slide rests on top of the bearing 72 integral with the eccentric. Washers 114 are provided between the inner end of the lower slide and the segment, and between the inner end of both of the slides and there is an additional washer above the inner end of the upper slide. A wavy washer 116 is captured between the upper washer 114 and the underside of the adjusting plate 118. The adjusting plate has upstanding wings 120 for manual manipulation. Screw 76 is tightened to load the wavy washer, and then the adjusting plate 118 is turned to rotate the eccentric by reason of the engagement of the dogs 122 on the underside of the plate with the notches 124 in the upper end of the eccentric to rotate the eccentric about the center of the shaft and sleeve. This will move the lens in the in-use position in an eliptical path to permit the lens to be centered with respect to the optical axis to maximize the image quality on the screen. Segment 88 is guided at its outer or radiused end. The upstanding edge 126 of the partition 60 is provided with two notches 128, 130 near the centerline of the reader and is provided with relatively wide notches 132 at each end of the edge 126. The depth of the notches 128, 130 and 132 is the same. The sides of the segment include a depending skirt 134 which can fit into the notches as follows. In the views shown in FIGS. 1, 4 and 5 the skirt 134 is engaged with notch 128 on one side of the segment, and the skirt 134 is engaged with notch 132 at the othr side of the segment. When the segment is shifted to bring the other lens 64 into operative position, the skirt 134 would engage notch 130 and the side slot 132 at the other end of the arc. The slides are guided by molded upstanding fingers 136 and the fingers 138 at the outer corners are turned over the slide to retain the associated slide in assembled position. The segment is supported and located by the notches 128 or 130 in position relative to the optical system. When the eccentric at the other end of the segment is moved, there will be movement of the lens which is in the operative position. After the adjustment has been made for the lens in the operative position, movement of the other lens into position will not change the centering of the image.

We claim:

1. In a microfiche reader of the type having a housing in which a fiche carrier is mounted for movement in a horizontal plane to position a selected image in a vertical path of light projected upwardly through the fiche, the improvement comprising,
   a pivot in said housing,
   eccentric means mounted on said pivot,
   a lens carrier pivotally mounted on said eccentric means for movement in a horizontal plane between first and second positions,
   a pair of lens guides in said carrier located so a lens supported by one guide will be positioned in said light path when the lens carrier is in its first position and the other guide positions a lens supported thereby in said light path when the lens carrier is in said second position,
   said eccentric means between the lens carrier and said pivot permitting the effective location of the lens carrier pivot to be adjusted to center the associated lens in said light path.

2. A microfiche reader according to claim 1 in which the lens carrier is guided by the housing remote from said pivot in either of said positions.

3. A microfiche reader according to claim 2 including focus means mounted on the carrier adjacent each lens guide and constrained to linear movement toward and from said pivot,
   said focus means including cam means,
   a lens barrel having a lens and mounted in each lens guide for vertical, non-rotational movement,
   said barrel including a cam follower means resting on said cam means so the lens is moved vertically and focused as the focus means is moved.

4. A microfiche reader according to claim 3 in which the cam means includes a cam on each side of each lens guide and the cam follower means comprises a follower on diametrically opposed sides of the barrel resting on similar elevations of the associated cam.

5. In a microfiche reader of the type having a housing in which a fiche carrier is mounted for movement in a horizontal plane to position a selected image in a vertical path of light projected inwardly through the fiche, the improvement comprising,
   a lens carrier pivotally mounted in the housing for movement in a horizontal plane between first and second positions,
   a pair of lens guides in said carrier located so a lens supported by one guide will be positioned in said light path when the lens carrier is in its first position and the other guide positions a lens supported thereby in said light path when the lens carrier is in said second position,
   focus means mounted on the carrier adjacent each guide and constrained to linear movement toward and from said pivot,
   said focus means including cam means,
   a lens barrel having a lens and mounted in the guide for vertical, non-rotational movement,
   said barrel including a cam follower means resting on said cam means so the lens is moved vertically and focused as the focus means is moved.

6. A microfiche reader according to claim 5 in which the cam means includes a cam on each side of such support and the cam follower means comprises a follower on diametrically opposed sides of the barrel resting on similar elevations of the associated cam.

7. A microfiche reader according to claim 6 including eccentric means between the lens carrier and its pivot permitting the effective location of the lens carrier pivot to be adjusted to center the associated lens in said light path.

8. A microfiche reader according to claim 7 in which the lens carrier is guided by the housing remote from said pivot in either of said positions.

* * * * *